(No Model.)
J. BARDSLEY.
KNOB ATTACHMENT.
No. 301,850. Patented July 15, 1884.
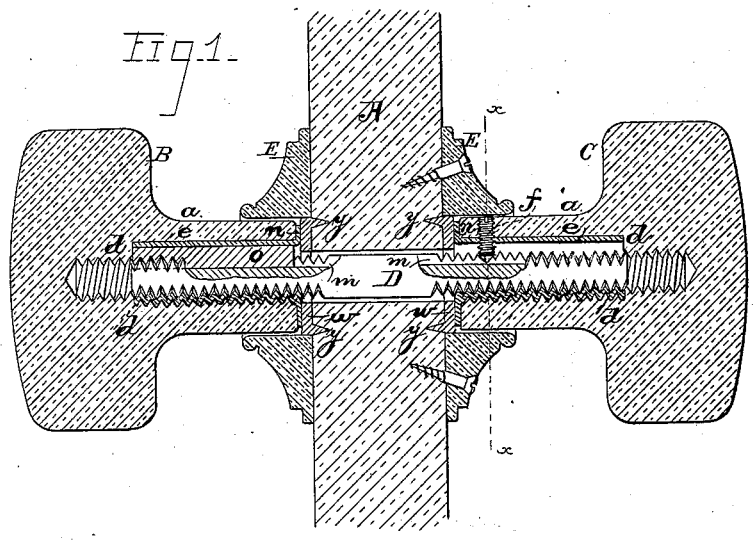
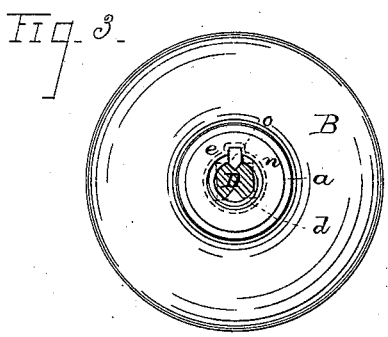
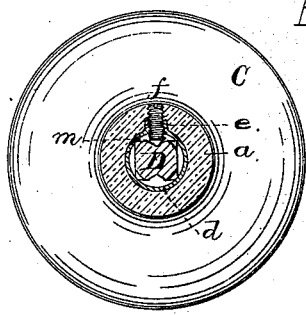
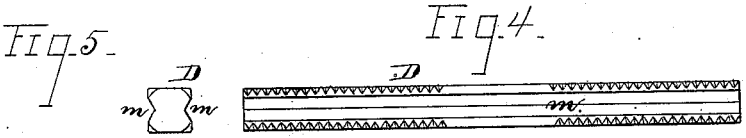
WITNESSES:
Herman Gustow
F. H. Chilton
INVENTOR
Joseph Bardsley,
BY
Chas. C. Gill
ATTORNEY

United States Patent Office.

JOSEPH BARDSLEY, OF NEWARK, NEW JERSEY.

KNOB ATTACHMENT.

SPECIFICATION forming part of Letters Patent No. 301,850, dated July 15, 1884.

Application filed December 26, 1883. (No model.)

*To all whom it may concern:*

Be it known that I, JOSEPH BARDSLEY, a citizen of the United States, and a resident of Newark, in the county of Essex and State of New Jersey, have invented certain new and useful Improvements in Door-Knobs, of which the following is a specification.

The invention relates to improvements in door-knobs, and will be understood from the description hereinafter presented, reference being had to the accompanying drawings, in which—

Figure 1 is a central vertical section of an embodiment of the invention, the spindle being illustrated in full, except at two points on its upper side, where it is partially broken away to show the screw and wedge, which secure the knobs rigidly in position. Fig. 2 is a section on the line $x\ x$ of Fig. 1. Fig. 3 is a view of the knob, looking at its inner end. Fig. 4 is a plan view of the spindle, and Fig. 5 is an end view of same.

In the drawings, A denotes the door; B C, the knobs; D, the spindle, and E E the roses, one being on each side of the door. The knobs B C are of wood, and within the shank $a$ of each of them is cut a socket to receive the metal lining or bush $d$, which, when inserted into the socket, has a surface corresponding with that of same, being afterward threaded by a suitable tool screwed therein, which will form the thread internally and externally by expanding the metal, the external thread being pressed into the wood, whereby the sleeve is effectually prevented from being drawn out of the socket. The longitudinal rib $e$ will be formed during the manufacture of the sleeve, and will enter a corresponding groove in the shank of the knob when the sleeve is inserted in position therein. Any number of ribs $e$ that may be desired may be formed in the sleeve $d$; but one will usually answer the purposes for which they are formed, which is to prevent the turning of the sleeve in its socket during the formation of the thread, or at any other time. The sleeve is provided on its outer end with an annular flange or collar, $n$, which bears against the inner end of the knob-shanks, as shown, and its thread will engage the end of the spindle D when the knob is introduced thereon. The shank $a$ of the knob is of proper diameter to receive the rose E, and permit it to be moved thereon toward or from the knob, and the rose is sufficiently thick adjacent to its central aperture to cover, when fastened to the door, the head of the screw $f$, which prevents the knob from turning or becoming loose upon the spindle. After the rose has been placed on the shank of the knob, and the latter has been screwed home upon the spindle, the rose is moved toward the knob and the screw $f$ then inserted, after which the rose is moved against the door and fastened, thereby effectually concealing the head of the screw $f$, and preventing any loosening thereof, or the hand from coming in contact therewith during the operation of opening or closing the door. The point of the screw $f$ enters the groove $m$, formed in the spindle D; and instead of employing a screw $f$ for each knob I lock one of them upon the spindle by a wedge or key, $o$, which is pressed into the groove $m$ and rib $e$ before the spindle is inserted through the door, it not being essential that both knobs be adjustable and removable. The groove or grooves $m$, when they are to extend the entire length of the spindle D, may be made during the formation of the spindle-rods, which is greatly cheapened, and its manufacture facilitated thereby. The continuous groove $m$ also permits of the employment of a wedge, $o$, for locking the knob.

Upon opposite sides of the door are applied the washers $w$, which encircle the aperture through which the spindle D passes, and are cast with spikes or points $y$, adapted to be driven into the door, whereby the washers may be rigidly affixed in position, and prevent any wear or abrasion of the door.

The hole which is drilled in the shank of the door-knob to receive the screw $f$ extends into the rib $e$, whereby when the screw is inserted it will form a thread (or the thread may be previously prepared) in the walls of the rib, and render the fastening very secure.

I have described the parts of my invention as applied to a wooden knob; but it must be understood that I do not confine myself to the employment of a knob of wood exclusively, although I may prefer, for the purposes of my business, to make use of knobs of that material. In the manufacture of composition knobs the sleeve $d$ will be threaded and ribbed, and the material molded thereon.

I reserve the right to make the method of making and securing the thin metal lining in the knob-shank by expanding its surfaces to form the internal and external thread, and the knob-spindle with its groove extending from end to end, the subject of additional applications for Letters Patent.

What I claim as my invention, and desire to secure by Letters Patent, is—

1. In a knob, the thin metal lining or bush having one or more longitudinal ribs which enter a corresponding groove or grooves in the knob-shank, the surfaces of said lining, with the exception of the rib, being expanded to form an internal and external thread, the latter being pressed into the knob-shank, substantially as set forth.

2. In a knob, the metal lining or bush threaded internally and externally, and having a longitudinal rib, in combination with the spindle having a threaded end and a grooved face, and with means which engage the rib and groove and lock the knob in position, substantially as set forth.

3. In a knob, the metal lining or bush threaded internally and externally, and provided with a longitudinal rib, in combination with the grooved and threaded spindle and wedge or key which engages the rib and groove, and thus locks the knob in position, substantially as set forth.

4. In a knob, the internally and externally threaded lining or bush having a rib which enters a corresponding groove in the knob-shank, and an annular collar or flange which bears against the end of said shank, substantially as set forth.

Signed at New York, in the county of New York and State of New York, this 22d day of December, A. D. 1883.

JOSEPH BARDSLEY.

Witnesses:
 CHAS. C. GILL,
 HERMAN GUSTOW.